United States Patent [19]

Le Baud

[11] Patent Number: 5,010,768
[45] Date of Patent: Apr. 30, 1991

[54] DEVICE FOR MULTIMEASUREMENT OF VERTICAL POSITION VARIATION AND A LEVEL-SETTING SYSTEM EQUIPPED WITH SAID DEVICE

[75] Inventor: Patrice Le Baud, Clamart, France

[73] Assignee: Societe d'Etudes Techniques et d'Entreprises Generales-Sodeteg, Le Plessis-Robinson, France

[21] Appl. No.: 368,365

[22] PCT Filed: Sep. 27, 1988

[86] PCT No.: PCT/FR88/00473

§ 371 Date: Jul. 31, 1989

§ 102(e) Date: Jul. 31, 1989

[87] PCT Pub. No.: WO89/03018

PCT Pub. Date: Apr. 6, 1989

[30] Foreign Application Priority Data

Sep. 29, 1987 [FR] France .................................. 87 13455

[51] Int. Cl.[5] ............................................. G01F 23/16

[52] U.S. Cl. ...................................... 73/299; 328/235; 52/421

[58] Field of Search ...................... 73/299, 301, 865.2; 33/366, 367; 328/235; 52/421; 405/229

[56] References Cited

U.S. PATENT DOCUMENTS 4,026,156  5/1977  Bowditch et al. ................. 73/865.2
4,356,639 11/1982  Opazo .................................. 33/367
4,651,433  3/1987  Mohr .................................... 33/366

Primary Examiner—William A. Cuchlinski, Jr.
Assistant Examiner—G. Bradley Bennett
Attorney, Agent, or Firm—Oblon, Fisher, McClelland, Maier & Neustadt

[57] ABSTRACT

A device for multimeasurement of vertical position variation of one or a number of predetermined points of an industrial or scientific construction of installation comprises means for measuring pressure which appears at the locations of these points and the variation of which is directly related to a variation in level of said points.

14 Claims, 3 Drawing Sheets

DEVICE FOR MULTIMEASUREMENT OF VERTICAL POSITION VARIATION AND A LEVEL-SETTING SYSTEM EQUIPPED WITH SAID DEVICE

BACKGROUND OF THE INVENTION

1. Field of the Invention

The present invention relates to a device for multimeasurement of vertical position variation and to a level-setting system equipped with a device of this type.

2. Description of the Prior Art

A measurement of vertical variation in position of one or a number of predetermined points of an industrial or scientific construction or installation, which makes it possible to follow a change in level of these points, often proves essential for good maintenance of said construction or installation. In fact, good operation of a structure such as a dam or an industrial or scientific installation such as a synchrotron is largely dependent on relative stability of its different parts. In point of fact, a construction or installation of this type often extends over a large land area whose structure, composition and hydrographic state may change from one location to another and cause unequal sliding of its strata or heterogeneous land subsidence which disturbs the operation or impairs the strength or good operation of the construction or installation considered. In a scientific installation such as that of a synchrotron, a variation in level by a value of one-tenth of a millimeter can already have an adverse effect on its operation or industrial or scientific exploitation. In order to overcome this drawback, some thought has been given to the possibility of controlling the variation in level of the principal points of an installation of this type by laser sighting. However, these points are often remote from each other or concealed with respect to each other. In order to obtain rapidly or at any moment data relating to the variation in level of these points, each point has to be equipped with a laser emitter and with an associated receiver. Equipment of this type entails the need for substantial capital outlay.

The present invention aims to circumvent these disadvantages by permitting the construction of an economical device for multimeasurement of vertical position variation which is capable of detecting variations of small values of the order of one-tenth of a millimeter and of an economical and effective level-setting system equipped with a device of this type which is capable of carrying out in an industrial or scientific installation even a position adjustment of its principal points by a small value of the order of one-tenth of a millimeter.

SUMMARY OF THE INVENTION

In accordance with the invention a device for multimeasurement of vertical position variation of one or a number of predetermined points of an industrial or scientific construction or installation essentially comprises means for measuring pressure which appears at the locations of said points and the variation of which is directly related to a variation in level of said points.

A system for level-setting of one or a number of predetermined points of an industrial or scientific installation such as that of a synchrotron equipped with a device for multimeasurement of vertical position variation of said points essentially comprises an assembly for level compensation involving dimensional change by thermal action, said assembly being inserted between said point or points and its support or their supports.

DESCRIPTION OF THE PREFERRED EMBODIMENTS

A device for multimeasurement of vertical position variation constructed in accordance with the invention is applicable to measurement, to surveillance or to control of level-setting of one or a number of predetermined points of an industrial or scientific construction or installation.

In accordance with an important feature, a device for multimeasurement of vertical variation in position of one or a number of predetermined points comprises means for measuring pressure which appears at the locations of said points and the variation of which is directly related to a variation in level of said points. Said device comprises means for converting results of said measurement of pressure variation to results of linear measurement of variation in level of said points. And said points are selected predetermined points which can be located very close together at distances of a few centimeters or very far apart at distances of several hundred meters.

Figure 1:
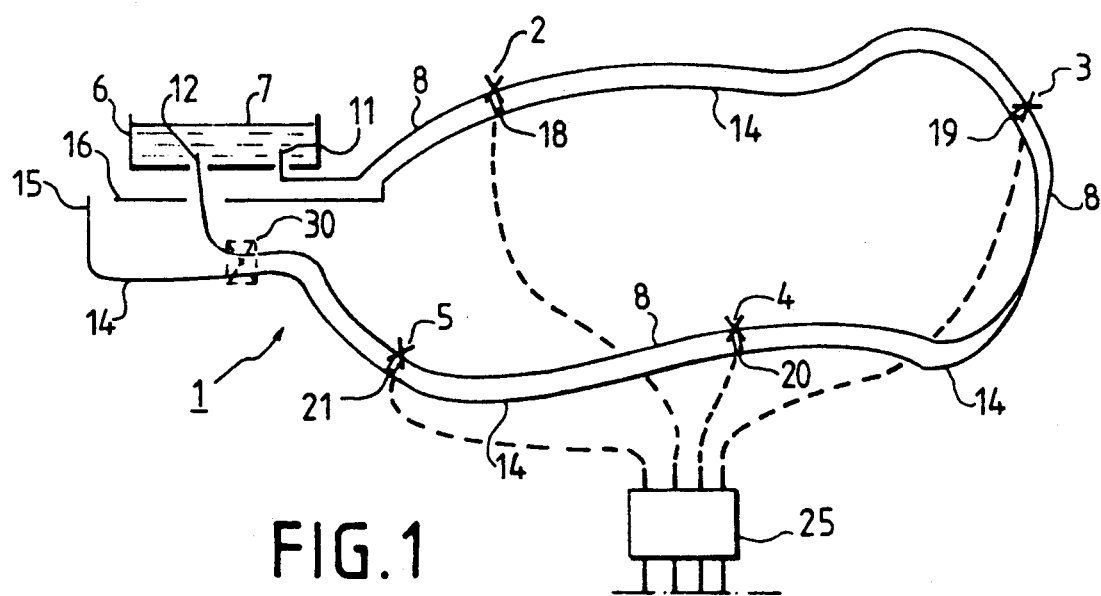
FIG. 1 is a schematic view of a device constructed in accordance with the invention for multi-measurement of vertical position variation.

In one example of construction illustrated in FIG. 1, a device 1 for multimeasurement of vertical position variation of several predetermined points 2, 3, 4, 5 comprises as pressure-measurement means on the one hand a tank 6 containing a liquid 7 and open to free air, a first tube 8 attached respectively to said points 2, 3, 4, 5 and having two ends 11, 12 in free communication with the tank 6 so as to be continuously filled with said liquid 7, a second tube 14 filled with air and also attached respectively to said points 2, 3, 4, 5 and having two ends 15, 16 which open freely to the surrounding atmosphere in proximity to the tank 6 containing liquid 7. The device further comprises pressure gages 18, 19, 20, 21 of known type which are attached on one side to the lower portion of the wall of the tube 8 containing liquid 7 respectively at the locations of the points 2, 3, 4, 5 and on the other side to the air tube 14. The means for converting the results of said measurement consists of an electronic apparatus 25 of known type (not described hereinafter) for amplifying and converting in known manner the electrical measurement data emitted by said gages to data relating to linear measurement of variation in level of said points, and of recording and/or display of said data.

When one point 2 of the points 2, 3, 4, 5 undergoes for example a variation in level dN (FIG. 2), the tube 8 containing liquid 7 and attached to said point follows its movement so that the height of column of liquid 7 within the tube 8 with respect to the free surface 28 of said liquid 7 within the tank 6 increases from h to H ($h+dH=H$), thus producing a variation in height of liquid column 7 by a value dH, whereupon the pressure gage 18 corresponding to said point 2 measures a variation in pressure of dP. The pressure variation dP measured by the gage 18 is therefore directly related to the variation in level dN.

In consequence, the variations in pressure dP measured by the gages, 18, 19, 20, 21 accurately represent the variations in level dN of the points 2, 3, 4, 5 and are directly converted to dN by the electronic apparatus 25 for acquisition of measurement results.

In the example illustrated, the liquid 7 consists of mercury, the liquid-filled tube 8 has a selected diameter between 1 and 2 centimeters and the air-filled tube 14 has a selected diameter between 0.3 centimeter and 10 centimeters.

The air tube 14 has ends which are located in proximity to the tank 6 and open freely into the atmosphere. This arrangement makes it possible to have a uniform reference atmospheric pressure at any point of said tube 14 and consequently t employ economical pressure gages which conform simply to a requirement of reliability of operation.

Figure 2:
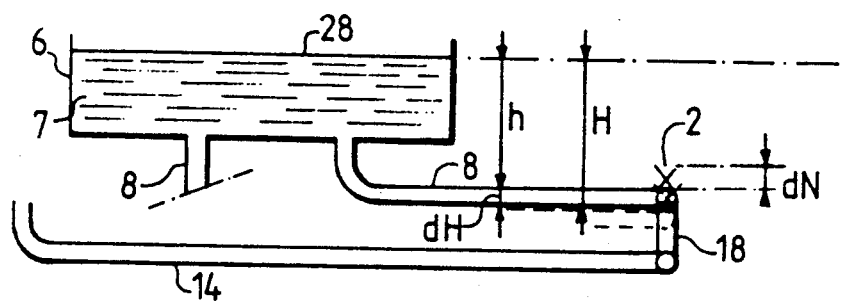
FIG. 2 is a partial schematic view to a different scale showing the device of FIG. 1.
Figure 3:
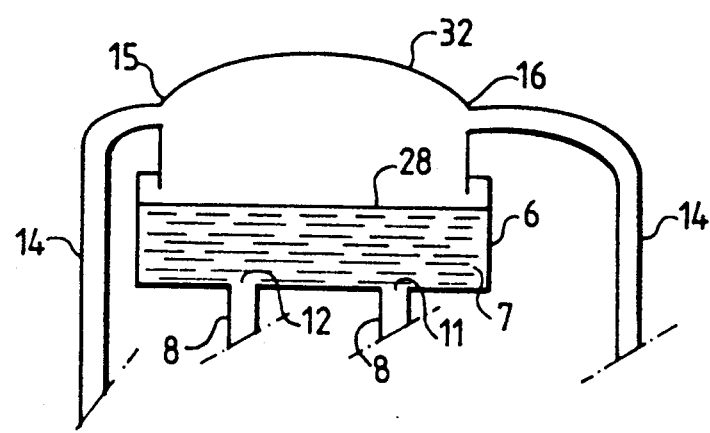
FIG. 3 is a partial schematic view to a different scale showing an alternative embodiment of the device of FIG. 1.

In a first alternative embodiment shown in FIG. 3, the device for multimeasurement of vertical position variation comprises the same elements as those of the device illustrated in FIGS. 1 and 2 except for the fact that the air tube 18 is dispensed with and the economical pressure gages 18, 19, 20, 21 are replaced by more costly pressure gages of the absolute type which must have good sensitivity and high precision.

In a second alternative embodiment of the liquid-flow device illustrated in FIGS. 1 and 2, a liquid circulation pump 30 is mounted within the tube 8 in order to accelerate and to perfect a filling with liquid 7.

In a third alternative embodiment of the device for multimeasurement of position variation as illustrated partially and schematically in FIG. 3, the tank 6 containing liquid 7 is closed by a cover 32 and the ends 15 and 16 of the air tube 14 have openings through said cover 32 above the free surface 28 of the liquid 7.

The device for multimeasurement of vertical position variation as illustrated in FIGS. 1 and 2 advantageously makes it possible to perform with the same ease measurements of variation in level of the predetermined selected points which are in direct view with respect to each other and measurements of variation in level of the predetermined selected points which are concealed with respect to each other. This great ease of measurement is not found in laser sighting systems already recalled in an earlier paragraph.

In accordance with the invention, a system for level-setting of one or a number of predetermined points, equipped with a device for multimeasurement of vertical position variation which is described in the foregoing and illustrated in FIGS. 1 to 3, comprises an assembly for level compensation involving dimensional change by thermal action, said assembly being inserted between said point or points and its support or their supports.

Figure 4:
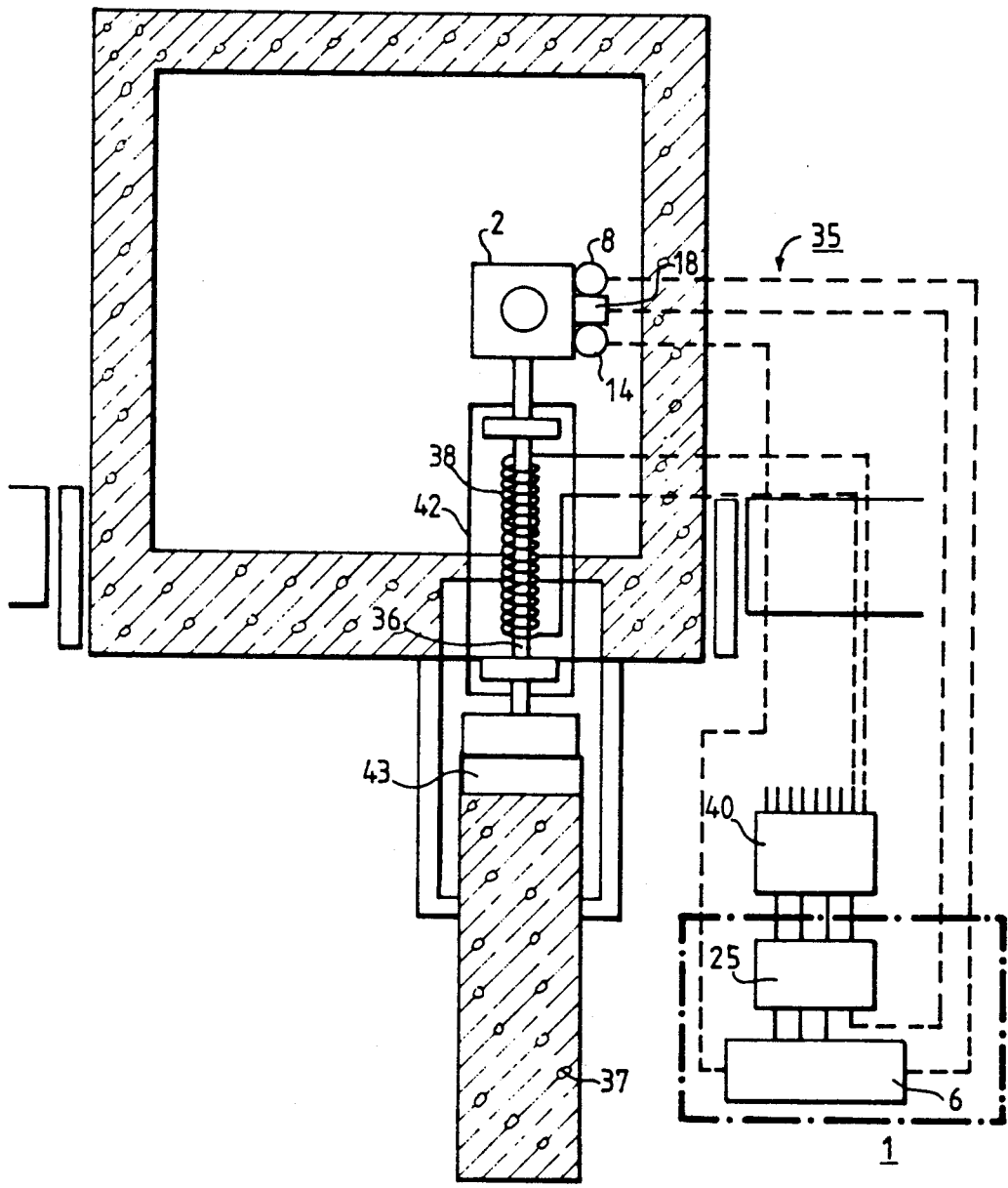
FIG. 4 is a partial schematic view to a different scale showing a level-setting system constructed in accordance with the invention and equipped with the device of FIG. 1 for multimeasurement of vertical position variation.

In one example of construction which is partially and schematically illustrated in FIGS. 1 and 4, a system 35 for level-setting of the points 2, 3, 4, 5 comprises an assembly for level compensation with dimensional change by thermal action. Said assembly consists on the one hand of thermally expansible elements 36 such as metal rods, jacks operating under the action of thermally expansible material and inserted respectively between these points 2, 3, 4, 5 and their respective supports 37, and heating elements 38 associated with said expansible elements 36. Said compensating assembly consists on the other hand of a device 1 for multimeasurement of vertical position variation and a control relay 40 of known type which connects the heating elements 38 to the corresponding outputs of the device 1 for multimeasurement of position variation or in other words to the outputs of its electronic apparatus 25 for acquisition of measurement results so as to provide said heating elements with automatic individual supply adjusted in electric power with a view to obtaining accurate automatic compensation of the variation in level of said points 2, 3, 4, 5 by means of said expansible elements 36 and restoring said points to the same plane which coincides with or is parallel to their initial plane and without inducing any mechanical vibration.

The expansible elements 36 and their associated heating elements 38 are preferably heat-insulated with respect to the surrounding medium by means of heat-insulating walls 42 and mechanically isolated from the supports 37 of said points 2, 3, 4, 5 by means of heat-insulating elements and/or anti-vibration elements.

Figure 5:
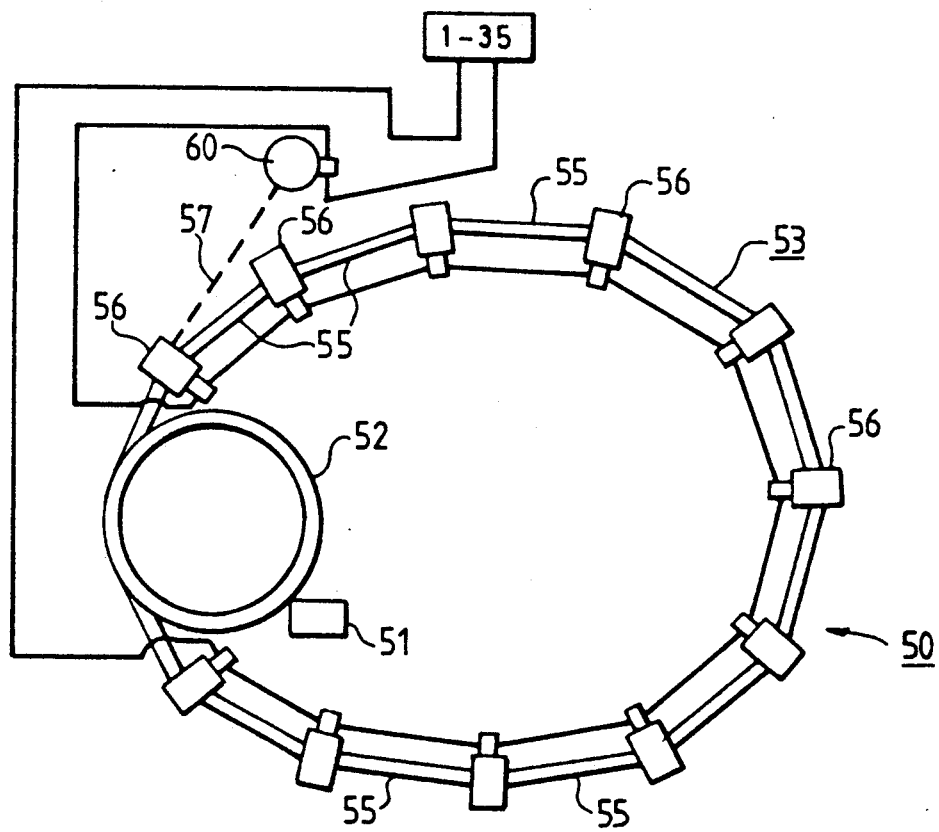
FIG. 5 is a partial schematic view to a different scale showing an electron synchrotron in which are mounted the vertical position variation multimeasurement device of FIG. 1 and the level-setting system of FIG. 4.

The device 1 for multimeasurement of vertical position variation and the level-setting system 35 are excellently applicable to the installation of a synchrotron 50 as illustrated partially and schematically in FIG. 5.

The synchrotron 50 includes an electron-injecting device 51, a synchrotron ring 52 and a storage ring 53.

In the example illustrated, the synchrotron ring 52 has a diameter of the order of 150 meters and the storage ring 53 has a diameter of the order of 270 meters. The storage ring 53 is usually formed by an end-to-end assembly of sections of straight tubes 55 and of electromagnets 56 at the level of their joints in order to bring the path of a traveling electron continuously in the axis of said successive sections of straight tubes 55.

By means of said storage ring 53, an electron which is injected by the device 51 into the synchrotron ring 52 within which it attains a sufficient velocity to be placed in the storage ring 53 is permitted to emit linear radiations 57 along the axis of the straight sections of tube 55 at the time of a change in direction of its path by means of the electromagnets 56 as it passes from one of said straight tube sections to another. Said linear radiations 57 pass out of said storage ring 53 and thus permit their industrial or scientific exploitation by an apparatus or receiver 60. In order to ensure correct operation of the synchrotron 50 and the receiver 60, the positions of the injector device 51 of the synchrotron ring 52 and storage ring 53 and of the receiver 60 must be stable or, in other words, the axes of these latter must be continuously located in the same plane. A variation in level of said devices 51, rings 52, 53 and apparatus 60 by a value of the order one-tenth of a millimeter is sufficient to disturb their operation.

The position multimeasurement device 1 and the level-setting system 35 described in the foregoing are capable of continuously bringing the axes of said devices 51, rings 52, 53 and apparatus 60 in the same plane which can coincide with or be parallel to their initial plane, thus enabling the synchrotron 50 and its industrial or scientific installation to operate normally in spite of variations in level of said elements caused, for example, by a landslide at the site location of said synchrotron installation.

In the position multimeasurement device 1, the thermally expansible elements 36 are equipped with thermal measurement means of known type which makes it possible to determine their dimensions.

What is claimed is:

1. A device for multimeasurement of vertical position variation of a number of predetermined points of an industrial or scientific construction or installation, wherein said device comprises means for measuring pressure which appears at the locations of said points and the variation of which is directly related to a variation in level of said points, said means being constituted by a tank containing liquid and open to free air and at least one tube which is attached respectively to said points and the ends of which are in free communication with the tank so as to be continuously filled with said liquid, and by pressure gages at least one of said gages being attached to a lower portion of a wall of said tube at each of said points and means for converting measurement results constituted by an electronic apparatus for amplification and conversion of the electrical measurement data emitted by said gages to data for linear measurement of variation in level of said points, and providing an output signal of said data.

2. A device according to claim 1, wherein the pressure measurement means of said device comprises a tank containing liquid and open to free air, a first tube which is attached respectively to said points and the ends of which are in free communication with the tank so as to be continuously filled with said liquid, and a second tube filled with air which is attached respectively to said points and the ends of which are open freely to the surrounding atmosphere in proximity to the tank and pressure gages at least one of said gages being attached on one side to a lower portion of a wall of the liquid-filled tube respectively at the locations of the points and on the other side to the air-filled tube, and means for conversion of measurement results constituted by an electronic apparatus for amplification and conversion of the electrical measurement data emitted by said gages to data relating to linear measurement of variation in level of said points, and providing an output signal of said data.

3. A device according to claim 2 wherein, within the pressure-measurement means, the air-filled tube has a diameter chosen between 0.3 centimeter and ten centimeters.

4. A device according to claim 1, wherein the pressure measurement means comprises a tank containing liquid and formed by a cover, a first tube which is attached respectively to the points aforesaid and the ends of which are in free communication with the tank so as to be continuously filled with liquid and a second tube filled with air which is attached respectively to said points and the ends of which open through the cover into the closed portion of the tank enclosure above the free surface of the liquid and pressure gages at least one of said gages being attached on one side to a lower portion of a liquid-filled tube respectively at the locations of the points and on the other side to the air-filled tube, and means for conversion of measurement results constituted by an electronic apparatus for amplification and conversion of the electrical measurement data emitted by said gages to data relating to linear measurement of variation in level of said points, and providing an output signal of said data.

5. A device according to claim 1 wherein, within the pressure-measurement means, the liquid which fills the tank and the tube attached to said tank consists of mercury.

6. A device according to claim 5 wherein, within the pressure-measurement means, the liquid-filled tube has a diameter selected between one centimeter and two centimeters.

7. A device according to claim 1 wherein, within the pressure-measurement means, the liquid-filled tube is provided with a liquid circulation pump.

8. A system for level-setting of a plurality of predetermined points of an industrial or scientific installation, such as that of a synchrotron, equipped with a device for multimeasurement of the vertical variation of position of said points according to claim 1, wherein said system comprises an assembly for level compensation involving dimensional change by thermal action, said assembly being inserted between said point or points and its support or their supports.

9. A system according to claim 8, wherein the assembly for level compensation involving dimensional change by thermal action comprises thermally expansible elements inserted respectively between the points and their respective supports and associated heating elements, and a position multimeasurement device and a control relay which connects said heating elements to the corresponding outputs of said position-variation multi-measurement device and provides said heating elements with automatic individual supply adjusted in electric power so as to determine precise compensation for the variation in level of said points by means of said expansible elements and to reset said points in one and the same plane.

10. A system according to claim 9 wherein, in the assembly for level compensation with dimensional change by thermal action, the thermally expansible elements are constituted by metallic rods.

11. A system according to claim 9 wherein, in the assembly for level compensation with dimensional change by thermal action, the thermally expansible elements are constituted by jacks which operate under the action of thermally expansible material.

12. A system according to claim 9 wherein, in the assembly for level compensation with dimensional change by thermal action, the thermally expansible elements and their associated heating elements are isolated by means of heat-insulating elements.

13. A system according to claim 9 wherein, in the assembly for level compensation with dimensional change by thermal action, the expansible elements and their associated heating elements ar isolated from the point supports by means of anti-vibration heat-insulating elements.

14. A system according to claim 9 wherein, in the assembly for level compensation with dimensional change by thermal action, the expansible elements are equipped with thermal measurement means for determining their dimensions.

* * * * *